US008181312B2

(12) United States Patent
Attinger et al.

(10) Patent No.: US 8,181,312 B2
(45) Date of Patent: May 22, 2012

(54) END-CONNECTOR AND METHOD FOR FASTENING A FLAT-BELT TYPE SUSPENSION MEANS OF AN ELEVATOR SYSTEM

(75) Inventors: Adrian Attinger, Merlischachen (CH); Daniel Fischer, Villarsel sur Marly (CH); David Risch, Herrliberg (CH)

(73) Assignee: Inventio AG, Hergiswil NW (CH)

( * ) Notice: Subject to any disclaimer, the term of this patent is extended or adjusted under 35 U.S.C. 154(b) by 1022 days.

(21) Appl. No.: 12/132,924

(22) Filed: Jun. 4, 2008

(65) Prior Publication Data

US 2009/0084636 A1 Apr. 2, 2009

Related U.S. Application Data

(60) Provisional application No. 60/941,743, filed on Jun. 4, 2007.

(51) Int. Cl.
*F16G 11/04* (2006.01)

(52) U.S. Cl. ..................... 24/136 R; 24/115 R; 187/411

(58) Field of Classification Search ........................ None
See application file for complete search history.

(56) References Cited

FOREIGN PATENT DOCUMENTS

| | | | |
|---|---|---|---|
| EP | 1 252 086 | A2 | 10/2002 |
| EP | 1 254 069 | A1 | 11/2002 |
| EP | 1 746 061 | A1 | 1/2007 |
| EP | 1 760 027 | A1 | 3/2007 |
| WO | WO 01/51400 | A1 | 7/2001 |
| WO | WO 01/53185 | A2 | 7/2001 |
| WO | WO 2006/029544 | A1 | 3/2006 |

*Primary Examiner* — Jack W. Lavinder

(74) *Attorney, Agent, or Firm* — Fraser Clemens Martin & Miller LLC; William J. Clemens

(57) ABSTRACT

An end-connector for fastening a flat-belt type suspension device of an elevator system comprises a housing with two side walls and a first and a second wrapping element each of which extends between the two side walls and is wrappable by the flat-belt type suspension device in a specified arrangement so as to hold the suspension means fast in the end-connector by frictional engagement. Marked on at least one of the two side walls on the outside that faces away from the wrapping elements is the specified arrangement of the suspension device.

13 Claims, 3 Drawing Sheets

View VIII

View / Section V – V

View VIII

Section VII–VII

END-CONNECTOR AND METHOD FOR FASTENING A FLAT-BELT TYPE SUSPENSION MEANS OF AN ELEVATOR SYSTEM

CROSS-REFERENCE TO RELATED APPLICATION

This application claims the benefit of U.S. provisional patent application Ser. No. 60/941,743 filed Jun. 4, 2007.

FIELD OF THE INVENTION

The present invention relates to an end-connector and a method for fastening a flat-belt type suspension means of an elevator system as well as an elevator system with such an end-connector.

BACKGROUND OF THE INVENTION

The present invention starts out from EP 1 760 027 A1, from which an end-connector is known comprising a housing with two side walls and a back wall. Two wrapping elements, which in the first embodiment have a circular, in the second embodiment a wedge-shaped, cross section extend between the two side walls and are wrapped by a poly V belt in a specified arrangement in which the poly V belt, starting from a load-free dead end, first partially wraps an upper wrapping element and is guided from this to the second wrapping element, and partially wraps this in the opposite direction. From the second wrapping element, the poly V belt is guided back to the first wrapping element, wraps this in the same direction, and is led out of the housing as the loaded suspension-means end. Through the second wrapping of the first wrapping element, under tensile loading the poly V belt presses the underlying layer against the first wrapping element and thus frictionally engages the poly V belt in the end-connector.

Through this specified arrangement, the poly V belt can be simply and safely held fast in the end-connector. For this to ensure self-locking, the poly V belt must wrap the wrapping elements in exactly the specified arrangement. Should the poly V belt, for example, not wrap the first wrapping element, no self-locking occurs, and under tensile loading the poly V belt would slip out of the end-connector. If, for example, on the other hand, the direction of routing is not adhered to, so that the poly V belt, starting from the loaded suspension-means end, wraps first the first, then in opposite direction the second, and finally in the same direction again the first wrapping element, so that the lower layer of the twice-wrapped first wrapping element emerges from the end-connector as loaded suspension-means end, under tension the first belt layer is not pressed onto the first wrapping element by the upper belt layer, so that also in this case no self-locking occurs and under tensile loading the poly V belt slips out of the end-connector.

Nevertheless, even with such faulty wrapping arrangements, frictional forces can withstand a limited tensile load so that through—especially manual—application of a verifying tensile force on the poly V belt, the correct wrapping in the specified arrangement that produces the self-locking effect cannot be reliably deduced. The faulty wrapping arrangement then only becomes apparent under increased tensile force or in operation of the elevator.

Starting from here, the present invention sets itself the task of creating an end-connector for flat-belt type suspension means that functions safely, is easily installable, and reduces the risk of a faulty wrapping arrangement.

SUMMARY OF THE INVENTION

An end-connector according to the present invention serves to fasten a flat-belt type of suspension means of an elevator system, wherein preferably one end-section of the suspension means is to be fixed to a fixed or movable part of the elevator system. In particular, the flat-belt type suspension means can be a poly V belt as known, for example, from EP 1 760 027 A. Nevertheless, with the end-connector, also other flat-belt type suspension means, particularly flat belts or toothed belts, can be fastened.

With an end-connector according to the present invention, such a flat-belt type suspension means can be fastened, for example, to a car, a counterweight, or an inertially fixed holding element of the elevator system. For this purpose, the end-connector can be connected in of itself known manner fixed or releasably with one of the said elevator system elements. For example, for this purpose the end-connector can have a suspension bolt which, preferably essentially aligned with the loaded suspension-means end of the suspension means, is screwed into the end-connector and at its end opposite to the screwed end is connected, for example also screwed, or welded, with the elevator car, the counterweight, the inertially fixed holding element, or suchlike. Equally well, the end-connector can have an eye through which a bolt penetrates, which, for example by screwing, is itself fastened in one of the said elevator system elements, so that the end-connector can be fastened in the manner of a shackle onto the respective elevator system element.

An end-connector according to the present invention has a housing with two side walls. The housing with the two side walls, as well as any back and/or front wall, can be manufactured monolithically or of multiple parts. In a preferred embodiment, the housing with the two side walls is manufactured monolithically as a cast body. In another preferred embodiment, the housing is assembled as multiple parts from the two side walls, for example by welding or bolting.

Extending between the two side walls are at least a first and a second wrapping element. In addition, further wrapping elements can be provided to increase the total wrapping angle of the suspension means over all wrapping elements and thereby the frictional engagement between suspension means and end-connector and/or another wrapping arrangement.

The wrapping elements can in each case be connected permanently or releasably with the two side walls. In a preferred embodiment, the first wrapping element is permanently connected with the two side walls, for example welded, or formed integrally with the two side halves, for example as a monolithic cast part. Since, as explained below, in a preferred specified arrangement the first wrapping element is wrapped with at least two layers by the suspension means, whereby under tensile loading an outward-lying layer of suspension means presses an inward-lying layer of suspension means against the first wrapping element and thereby holds the suspension means self-lockingly fast in the end-connector, the first wrapping element absorbs a large load. It is therefore especially advantageous if this first wrapping element is connected in particularly loadable manner with the side walls and can thus transfer the forces out of the suspension means into the end-connector. Such loadable connections can be advantageously represented by the permanent, i.e. unreleasable, connection, and in particular through the integral embodiment of the first wrapping element and the side walls.

Preferably, the second wrapping element is releasably connectable with the two side walls. Installability of the suspension means in the end-connector is thereby greatly improved. This is because on the remote second wrapping element the suspension means can first be simply inserted into the end-connector. Also, after removal of the second wrapping element, the suspension means can be more easily pulled out of the end-connector.

For this purpose, in an advantageous embodiment of the present invention, the second wrapping element is embodied as a bolt which, at its first end, has a cylindrical step in the form of a reduction in cross section. One of the two side walls then has a breakthrough through which the second wrapping element can be inserted in the direction towards the other of the two side walls. This other of the two side walls itself has on its inside that faces towards the wrapping elements a continuous recess which accepts the cylindrical step of the second wrapping element. The second wrapping element has an axial longitudinal extension of such manner that, in the assembled state, it rests both in the breakthrough in the one side wall and in the recess in the other side wall in radial direction.

To secure the second wrapping element against falling out in the direction opposite to that of insertion, a securing means can be releasably fastened on the outside of the one side wall that faces away from the wrapping element. Especially preferably, such a securing means can comprise a plate which, by means of a screw, can be releasably fastened on the outside of the one side wall. The plate can wholly or partly cover the end-face of the second end of the second wrapping element and thus secure it against falling out with a movement opposite to that of its insertion. Preferably, in this case, the second wrapping element has at its second end opposite to the said cylindrical step a flattening that interacts with an edge of the securing means in such manner that the second wrapping element with installed securing means is held fast in the housing of the end-connector not only axially but also non-rotatingly.

In another preferred further embodiment of the present invention, the second wrapping element comprises a bolt and a bush that is mounted on the bolt. Each of the two side walls has a breakthrough through which the bolt, but not the bush, can be inserted. The bolt has an axial lengthwise extension of such manner that in the installed state in the radial direction it rests in the breakthroughs that are present in the side walls. Preferably, the bolt, and correspondingly the breakthroughs, have complementary non-rotationally symmetrical cross sections, preferably angular cross sections, so that in the installed state the bolt is held non-rotationally fast in the side walls.

For the purpose of installation, the bush is first inserted from the front or back between the two side walls, so that a pass-through opening is formed in the longitudinal direction of the bush which aligns with the breakthroughs in the side walls. Subsequently, the bolt is inserted through the one side wall and the bush, and secured axially on the bush and/or the housing against falling out in the direction opposite to that of insertion. For this purpose, for example, the bolt and the bush can be connected together by means of a headless screw, a pin, or suchlike. Equally, there can be provided in the bolt in radial direction a spring-loaded securing element which under the spring loading engages in a corresponding opening in the pass-through opening of the bush.

Expediently, also the pass-through opening in the bush is embodied in such non-rotationally symmetrical manner that through mechanical engagement the bush interacts with the external contour of the bolt and is held non-rotationally fast on the latter.

Equally, in both embodiments, a pin can be embodied on the inside of the other side wall, preferably integrally with the latter, and engage in a corresponding drilled hole in the wrapping element or bolt.

According to the present invention, marked on at least one of the two side walls of the end-connector on the outside that faces away from the wrapping elements is the specified arrangement of the suspension means. Hereby, the user is not only given a simple means for slinging the suspension means in the specified arrangement around the wrapping elements. In particular, a faulty wrapping arrangement is immediately apparent, since this does not match the prescribed arrangement of the suspension means that is marked on the outside. Thus, for example, a missing wrap of a wrapping element, a wrap in the wrong direction of rotation, or the entry or exit of the suspension means at a different position than a foreseen entry or exit opening, is immediately apparent.

Particularly advantageously, with correct, i.e. specified, wrapping arrangement, on entry to, or exit from, the housing, the suspension means that is visible from outside quasi continues on the outside so that it is recognizable whether the suspension means correctly enters into and exits from the end-connector.

The marking for the specified arrangement can be embodied integrally with the side wall. For example, it can be worked into the side wall as a recess or executed as a raised structure. Both embodiments can be realized either by post-machining or—particularly advantageously—by primary forming the outside of the housing, for example by casting.

Such integral marking has a number of advantages. Firstly, it is more resistant to the harsh environmental conditions that generally prevail in elevator hoistways than a subsequently applied marking. Furthermore, even with a soiled surface, it is still detectable, particularly haptically. Moreover, manipulations of the marking can be prevented.

Preferably, at least one side wall has a breakthrough, through which the flat-belt type suspension means is visible when it is inserted into the end-connector. Hereby, the route of the suspension means can be made visible also in an internal area of the housing that is not visible from the outside, and thus a correct, specified wrapping arrangement differentiated from a faulty wrapping route that deviates therefrom.

Particularly preferably, the breakthrough cuts the marking that is present on the outside of the housing that symbolizes the specified arrangement of the suspension means, thereby ensuring that the suspension means with correct wrapping arrangement is visible in the breakthrough. With correct arrangement of the suspension means, as on entry of the suspension means into, or its exit from, the end-connector, also in the said breakthrough, the visible route of the suspension means through the marked route of the suspension means is continued and reversed. A faulty wrapping arrangement is therefore easily recognizable.

According to a preferred embodiment of the present invention, the end-connector can comprise a dead-end hitch for fixing the dead end—i.e. the free suspension-means end—of the suspension means. This dead-end hitch can be installed in the area of an exit opening to lead out the dead end of the suspension means out of the housing, and allows the dead end of the suspension means to be held fast in the exit opening by frictional engagement. This device also helps to ensure that the suspension means is not erroneously threaded in the wrong direction through the end-connector and around the wrapping elements. Since it is obvious to everyone that with the dead-end hitch the dead end of the suspension means is to be fixed, it is immediately recognizable when the dead end of the suspension means is routed out of the wrong exit opening.

As proposed in EP 1 760 027 A1, the dead-end hitch can comprise a wedge which, as a result of the wedge action, forces the dead end against the housing by frictional engagement. Advantageously, however, for this purpose a round bolt and a tension means, for example a screw, can be provided, which pretensions the round bolt in the exit opening and against the dead end and thus holds the latter fast against the housing by frictional engagement.

The present invention is particularly explained with wrapping elements with circular cross section. However, other forms of cross section are also possible, particularly wrapping elements with wedge-shaped cross section.

The method according to the present invention for fastening a flat-belt type of suspension means of an elevator system by means of an end-connector comprises at least the method step of provision and attachment to the end-connector of a marking showing the specified arrangement of the suspension means. The marking can, for example, be created by machining or casting of the housing of the end-connector, with the marking being present as a (raised) structure protruding from the housing wall or as a recess worked into the housing wall.

An advantageous further development of the method is that it contains a further method step, namely insertion of the suspension means into the end-connector and placing of the suspension means in the end-connector in such a manner that the arrangement of the suspension means corresponds with the arrangement that is specified by the marking. The suspension means is thereby held fast in the end-connector by frictional engagement.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The U.S. provisional patent application Ser. No. 60/941,743 filed Jun. 4, 2007 is hereby incorporated herein by reference.

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
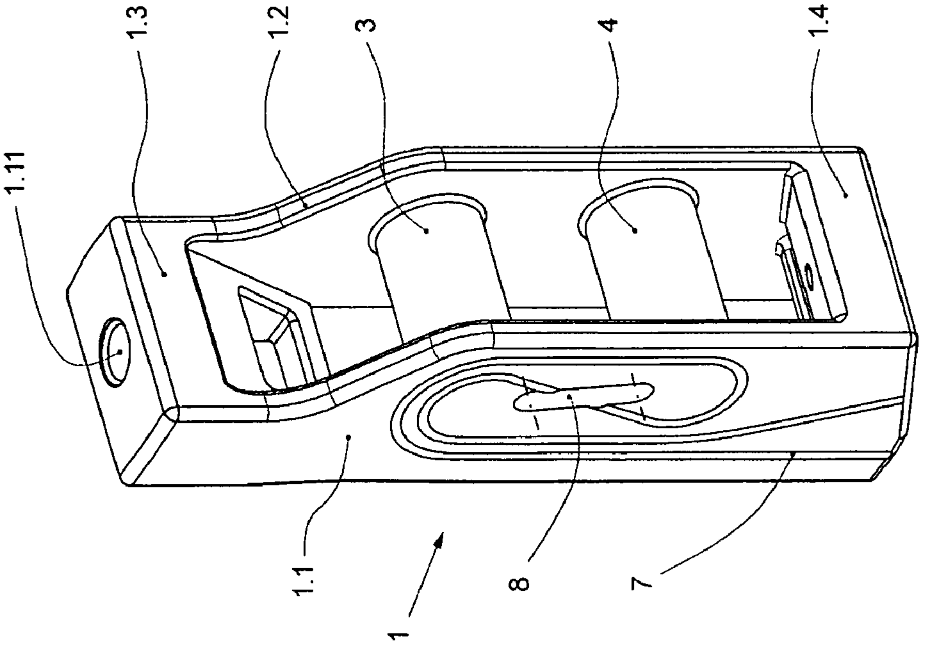
FIG. 1 is a perspective view of an end-connector according to a first embodiment of the present invention from diagonally in front and above.

FIG. 1 shows a first embodiment of the end-connector according to the present invention which is particularly characterized in that the wrapping elements 3, 4 that serve to fix the belt-like suspension means are permanently connected with the two side walls 1.1, 1.2 of the housing 1 of the end-connector.

Figure 2:
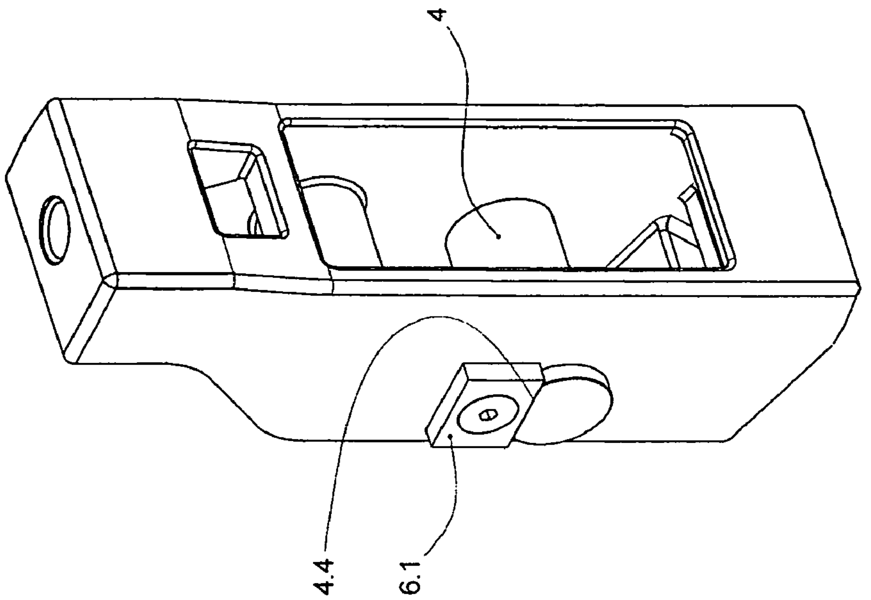
FIG. 2 is a perspective view of an end-connector according to a second embodiment of the present invention from diagonally behind and above.
Figure 5:
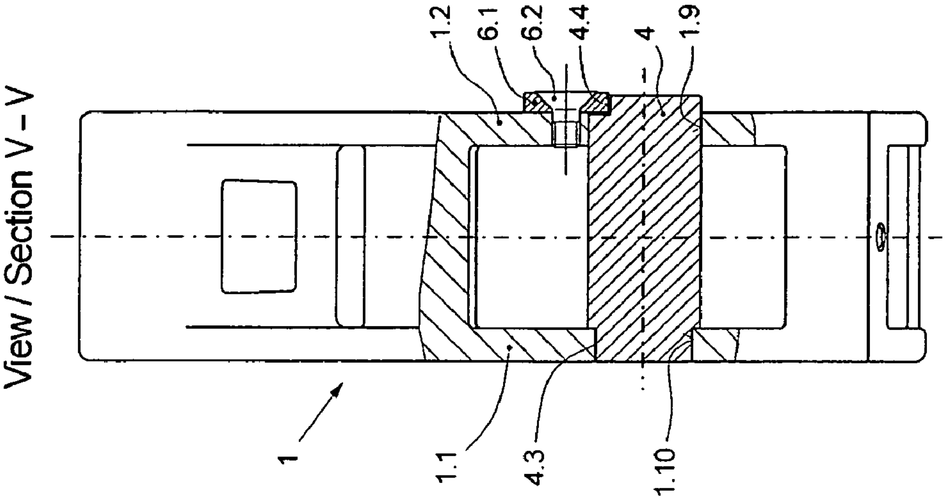
FIG. 5 a view of the end-connector according to FIG. 2 in partial cross section along the line V-V in FIG. 4 through a wrapping element.
Figure 4:
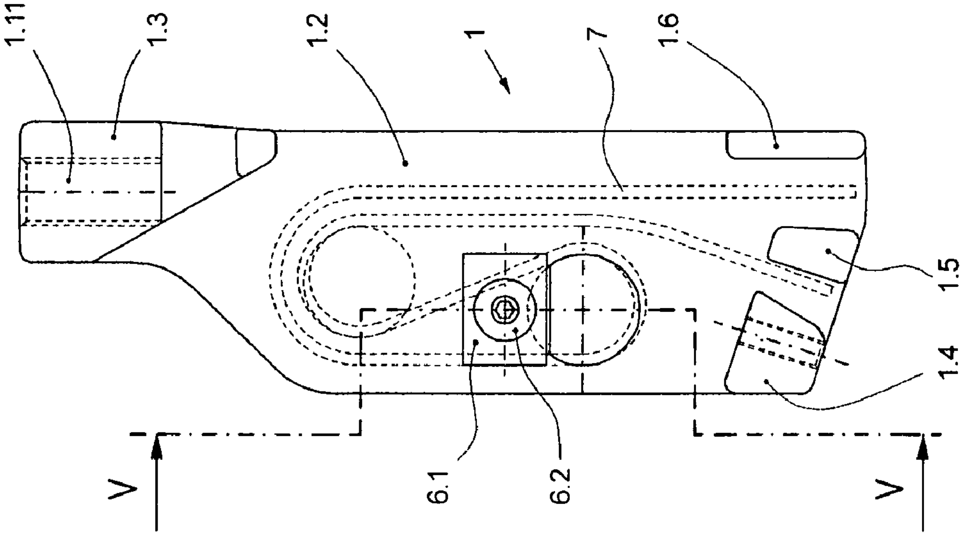
FIG. 4 is a side elevation view of the end-connector according to FIG. 2 onto the outside of a side wall.

FIGS. 2, 4, and 5 show a second embodiment of the end-connector according to the present invention, which is particularly characterized in that the second (lower) wrapping element 4 can be inserted into the two side walls 1.1, 1.2 of the housing 1 and locked in this position.

Figure 8:
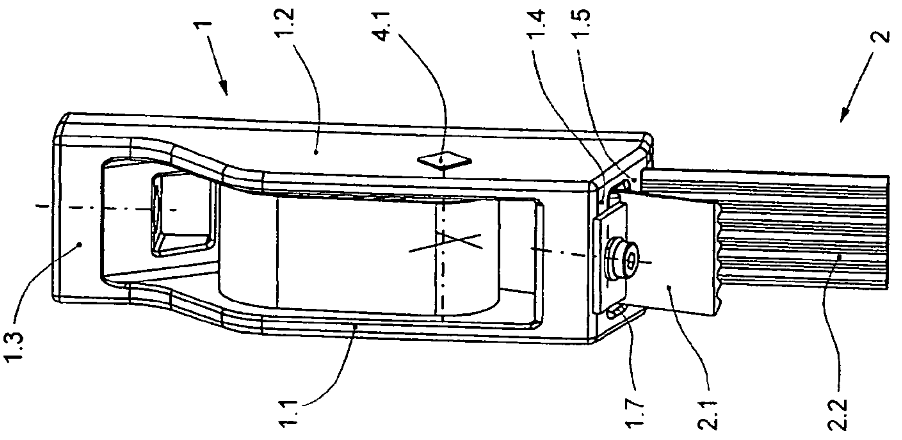
FIG. 8 shows the end-connector according to the third embodiment of the present invention in a perspective overall view from diagonally in front and below with inserted suspension means.
Figure 7:
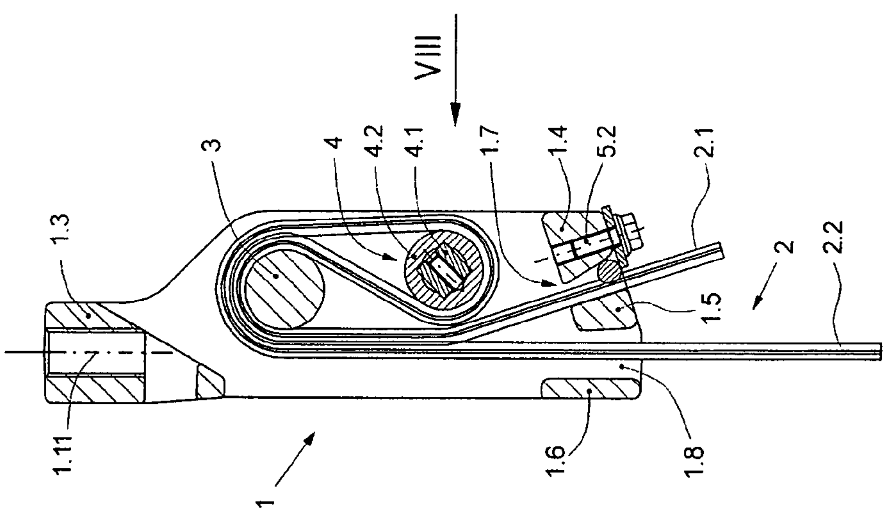
FIG. 7 a view in cross-section through the end-connector according to FIG. 6 along the line VII-VII.
Figure 6:
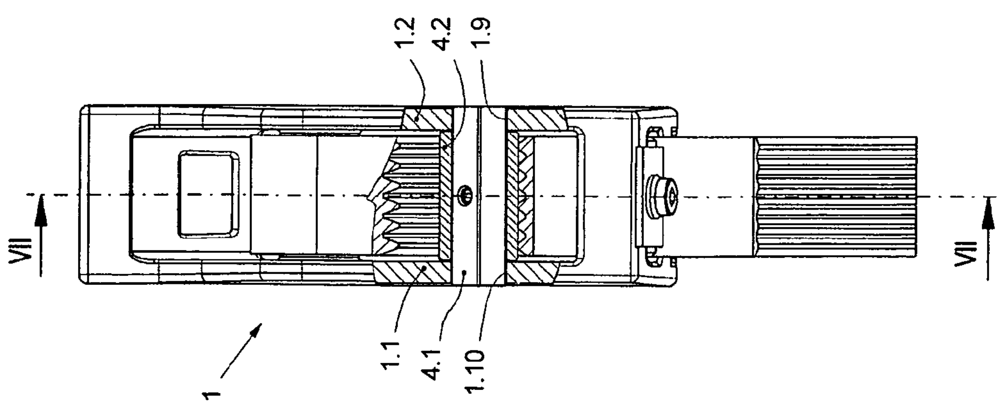
FIG. 6 is a partially cutaway side view from in front onto an end-connector according to a third embodiment of the present invention with inserted suspension means.

FIGS. 6 to 8 show a third embodiment of the end-connector which differs from the first and second embodiments in that the second wrapping element 4 is so executed and fixed in the housing 1 in such manner that it does not project over the side walls 1.1, 1.2.

As can be particularly well seen in FIGS. 6 to 8, the housing 1 of an end-connector according to the present invention is preferably constructed as follows.

The housing comprises a first side wall 1.1 and a second side wall 1.2, which are connected by an upper yoke 1.3, and three lower yokes 1.4 to 1.6, and is manufactured monolithically as a formed part. Formed between a first lower yoke 1.4 and a second lower yoke 1.5 is an exit opening 1.7, out of which a dead end 2.1 of a suspension means or device 2 is led. Between the second lower yoke 1.5 and a third lower yoke 1.6 is an exit opening 1.8 through which the suspension means 2 is led into the housing of the end-connector.

In the third embodiment of the end-connector illustrated with FIGS. 6 to 8, a first wrapping element 3 and a second wrapping element 4 extend between the two side walls 1.1, 1.2. The first wrapping element 3 is then also manufactured integrally with the two side walls 1.1, 1.2, and the yokes 1.3 to 1.6 by primary forming. The second, lower wrapping element 4 comprises a bolt 4.1, which can be pushed into the side walls 1.1, 1.2 from outside through side breakthroughs 1.9, 1.10 in the side walls 1.1, 1.2. Before insertion of the bolt, the bush 4.2 is pushed between the two side walls 1.1, 1.2 from in front in such manner that a pass-through opening that penetrates the bush 4.2 in its longitudinal direction aligns with the breakthroughs 1.9, 1.10. The bolt 4.1 is then pushed in through the breakthroughs 1.9, 1.10, whereby it penetrates through the pass-through opening of the bush 4.2.

The bolt 4.1 has a rectangular non-rotationally symmetrical cross section. The breakthroughs 1.9, 1.10 and the pass-through opening in the bush 4.2 have cross sections that are complementary hereto so that the inserted bolt 4.1 and the bush 4.2 are non-rotatingly held in the two side walls 1.1, 1.2. To secure the bolt 4.1 against sliding out of the breakthroughs, the former has in radial direction a channel in which a ball is accommodated and radially pretensioned towards the outside by a (not shown) spring. At a suitable point, the pass-through opening in the bush 4.2 has a corresponding recess into which, when the bolt 4.1 is inserted into the bush 4.2 and positioned centrally relative to the latter, the ball engages under partial detensioning of the spring. On insertion of the bolt 4.1 into the bush 4.2, the ball is first pushed into the channel so far against the tension of the spring that the bolt 4.1 can be inserted. When the bolt reaches its foreseen installed end position, under partial detensioning of the spring the ball snaps into the recess in the pass-through opening of the bush 4.2 that is provided for this purpose and thus holds the bolt 4.1 and the bush 4.2 axially fast relative to each other.

The cross section of the breakthroughs 1.9, 1.10 is smaller than the cross section of the bush 4.2, so that the latter cannot come out of the housing through the breakthroughs 1.9, 1.10. Through the bolt 4.1 being axially held fast relative to the bush 4.2, the second wrapping element 4 that is formed by the bolt 4.1 and the bush 4.2 is secured against falling out of the housing 1.

The suspension means 2 wraps the two wrapping elements 3, 4 in the arrangement that can be seen in FIG. 7. Therein, starting from a dead end 2.1, the suspension means first wraps the first wrapping element 3 in mathematically negative direction by somewhat more than 180°, then the second wrapping element 4 in mathematically positive direction by somewhat more than 180°, and then again the first wrapping element 3, and the inside-lying layer of suspension means arranged thereon, in positive direction by approximately 180°, before the suspension means 2 as loaded suspension-means end 2.2 is led out of the entry opening 1.8 of the housing. Under tensile loading of the loaded suspension-means end 2.2, the outward lying layer of the suspension means presses the inward lying layer of suspension means onto the first wrapping element 3, and thereby holds the suspension means 2 self-lockingly fast in the end-connector by frictional engagement.

By reference to FIGS. 6 and 7, there now follows explanation of an advantageous method for inserting and fixing the suspension means 2 into an end-connector with uninstallable second (lower) wrapping element 4. The dead end 2.1 of the suspension means 2 is first inserted through the entrance opening 1.8 into the housing 1 and then led above the upper wrapping element 3 towards the front (in FIG. 7, to the right) and out of the housing, where a suspension means loop is formed. The dead end 2.1 of the suspension means is then led back between the suspension means section that forms the loaded suspension-means end 2.2 and the upper wrapping element 3 into the housing and then led out of the latter through the exit opening 1.7. The bush 4.2 is laid into the previously formed suspension means loop. Hereupon the bush, along with the suspension means loop, is moved into the area of the lower wrapping element 4 between the two side walls 1.1, 1.2 of the housing in such manner that the pass-through opening of the bush 4.2 aligns with the breakthroughs 1.9, 1.10. The bolt 4.1 is then pushed through these breakthroughs until its above-described ball engages with the recess in the pass-through opening of the bush 4.2.

By means of a round bolt 5.1, the dead end 2.1 is then held fast by frictional engagement against the second lower yoke 1.5 in that a screw 5.2 tensions the dead end 2.1, which is forcibly guided on an incline, against the dead end 2.1. Hereupon, before the round bolt 5.1 tensions the dead end 2.1 against the second lower yoke 1.5, the dead end 2.1 is placed under pretension, i.e. has applied to it a tensile load, before it is held fast by the dead-end hitch by frictional engagement. By this means the dead end 2.1 can have applied to it a pretension that not only additionally pretensions the round bolt 5.1 on account of the inclined guidance, and so counteracts a release of the dead-end hitch and a sliding out of the dead end 2.1 out of the exit opening 1.7, but also reinforces through additional tensile forces the frictional forces acting on the wrapping elements 3, 4, and thereby the fixing of the suspension means 2 in the end-connector.

By reference to the FIGS. 2, 4, and 5, there now follows a detailed explanation of the second embodiment of the end-connector according to the invention, which differs from the third embodiment explained above only in the execution of the second wrapping element 4. The other characteristics and components that correspond to the third embodiment are therefore referenced with the same reference numbers and not explained further.

As is readily visible in FIGS. 2, 4, and 5, in the second embodiment, the second wrapping element 4 is embodied monolithically as a cylindrical round bolt, which on its front end-face in the direction of insertion has a step 4.3 in the direction of its circumference in the form of a cylindrical reduction in diameter, and in the area of its oppositely lying second end-face has a flattening 4.4. In the lengthwise direction of the round bolt, this flattening 4.4 is bounded by a plane surface parallel to the end-face. The flattening 4.4 interacts with the straight edge of a plate 6.1 to secure the round bolt, i.e. the wrapping element 4, against rotation.

The one side wall 1.1 has a breakthrough 1.10 with a diameter that matches the diameter of the cylindrical step 4.3 of the round bolt that forms the wrapping element 4. This breakthrough 1.10 accepts the step 4.3 of the round bolt. The other side wall 1.2 has a breakthrough 1.9 with a diameter that matches the greatest diameter of the round bolt. Through this breakthrough 1.9, the round bolt can be inserted through the side wall 1.2 in such manner that its cylindrical step 4.3 enters into engagement with the recess 1.10. The length of the round bolt is so dimensioned that, in the installed state, the plane surface of its cylindrical step 4.3 rests against the inside of the side wall 1.1 when the plane surface that is parallel to the end-face of the round bolt and bounds the flattening 4.4 aligns with the outside of the side wall 1.2.

After insertion of the round bolt that forms the wrapping element 4, the plate 6.1 is held fast against the side wall 1.2 by a screw 6.2. Its lower, straight edge that faces towards the round bolt interacts with the said plane surface and the flattening 4.4 of the round bolt by form-fit, and thus prevents an axial sliding out of the round bolt opposite to its insertion movement as well as its rotation. As described above, the suspension means (which is not shown in FIGS. 1 to 5) can wrap the first and second wrapping elements and thus be held fast in the end-connector by frictional engagement. As in the third embodiment, a dead-end hitch (also not shown in the said figures) can additionally press the dead end of the suspension means against the second lower yoke 1.5 and thus increase the frictional engagement between the end-connector and the suspension means 2.

In a manner not shown in greater detail, a suspension bolt can be screwed into a drilled hole 1.11 in the upper yoke 1.3 of the end-connector and thus connect the end-connector and thereby the suspension means with an elevator car, a counterweight or a (not shown) inertial holdfast element.

By reference to FIGS. 1 and 3, the marking applied on the outside of the specified arrangement of the suspension means will now be explained. These explanations apply equally for all embodiments of the end-connector.

Figure 3:
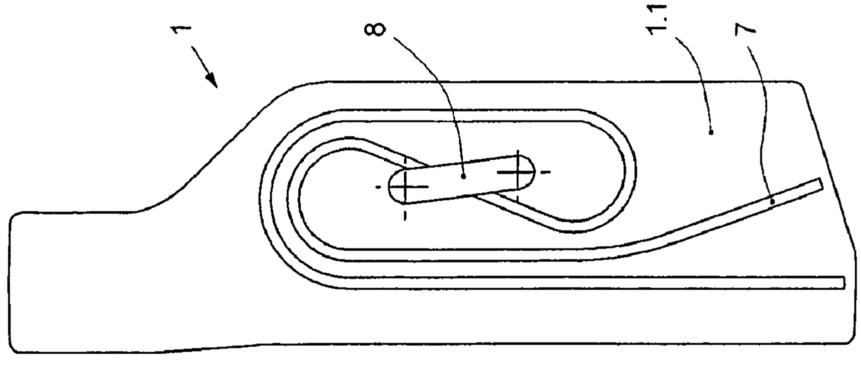
FIG. 3 is a side elevation view of the end-connector according to FIG. 1 onto the outside of a side wall.

As can be seen in FIGS. 1 and 3, marked on the outside of the one side wall 1.1 of the housing 1 of the end-connector is the specified arrangement of the suspension means. For this purpose, the wrapping arrangement is stamped in the outside of the side wall 1.1 in the form of a marking 7 that symbolizes the suspension means. This marking 7 can, for example, be manufactured together with the side wall 1.1 during primary forming, or subsequently worked into the latter. It can, for example, be present in the form of a protuberance or a recess relative to the outside. As is particularly evident in the combined views of FIG. 3 and FIG. 7, the suspension-means end 2.2 that is visible from outside continues into the marking 7 that is formed on the outside, which itself optically continues in the exit opening 1.7 in the dead end 2.1 that is again visible from the outside.

Should the wrapping arrangement in the inside of the end-connector not be correct, because, for example, the suspension means wraps the first and/or second wrapping element 3, 4 in the wrong direction of rotation or not at all, a difference arises between the specified marking 7 that is marked on the outside, and the actual route of the suspension means as it is recognizable diagonally from the front in the open front and back of the housing. The risk of a faulty arrangement of the suspension means is thereby reduced.

In the first side wall 1.1 there is a breakthrough 8 formed in such manner that through it the suspension means is partially visible. The breakthrough 8 thus cuts the marking 7 that is applied on the outside. If the suspension means 2 is correct, i.e. routed in the specified arrangement around the wrapping elements 3, 4, the marking 7 in the breakthrough 8 continues in the suspension means 2 that is visible therein. Thus, should the suspension means 2 not be visible as connecting the marking 7 that is interrupted by the breakthrough, or not visible at all, a wrong arrangement of the suspension means that is partially concealed by suspension means can be recognized also in the inside of the end-connectors. This also reduces the risk of an incorrect arrangement.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An end-connector, to fasten a flat-belt type suspension means of an elevator system, with a housing that includes two side walls and a first and a second wrapping element that each extend between the two side walls and can be wrapped in a specified arrangement by the flat-belt type suspension means so as to hold the suspension means fast in the end-connector by frictional engagement, comprising: on an outside of at least one of the two side walls facing away from the wrapping elements, a marking is provided that marks a specified arrangement of the suspension means, wherein at least one of the first and second wrapping elements is accommodated releasably in the housing and wherein the at least one of the first and second wrapping elements is inserted through one of the two side walls and is secured in the housing against movement and rotation.

2. The end-connector according to claim 1 wherein said marking is formed integrally with said at least one side wall as at least one of a recess and a protuberance.

3. The end-connector according to claim 1 wherein a dead-end hitch can be held fast in an exit opening of the housing to lead a dead end of the suspension means out of the housing so as to hold the dead end of the suspension means fast in said exit opening by frictional engagement.

4. The end-connector according to claim 3 wherein said dead-end hitch has a round bolt or wedge and a tension means for fixing said round bolt or wedge respectively in said exit opening and pretensioning against said dead end.

5. The end-connector according to claim 1 including at least one of the first and second wrapping elements being formed as a round bolt or wedge.

6. The end-connector according to claim 1 wherein at least one of the first and second wrapping elements has a bolt and a bush, said bush being inserted between the two side walls and said bolt being inserted through one of the two side walls and said bush.

7. The end-connector according to claim 6 wherein when said bolt is pushed through said bush, said bolt is arranged in the side walls and said bush is rotationally fixed on said bolt.

8. The end-connector according to claim 1 wherein the at least one side wall has a breakthrough through which the flat-belt type suspension means, preferably only in the specified arrangement, is visible.

9. The end-connector according to claim 8 wherein said breakthrough, through which the flat-belt type suspension means is visible, cuts said marking of the specified arrangement of the suspension means that is present on said outside of the at least one of the two side walls.

10. An elevator system with a flat-belt type suspension means and an end-connector according to claim 1 for fastening the suspension means to one of a car, a counterweight and an inertially fast holding element.

11. A method for fastening a flat-belt type suspension means of an elevator system by an end-connector that includes at least one wrapping element, the method comprising the steps of:

providing the end-connector with a housing that includes two side walls and a first and a second wrapping element that each extend between the two side walls and can be wrapped in a specified arrangement by the flat-belt type suspension means so as to hold the suspension means fast in the end-connector by frictional engagement; and applying on an outside of at least one of the two side walls facing away from the wrapping elements, a marking showing a specified arrangement of the suspension means, wherein at least one of the first and second wrapping elements is accommodated releasably in the housing and wherein the at least one of the first and second wrapping elements is inserted through one of the two side walls and is secured in the housing against movement and rotation.

12. The method according to claim 11 including a further step of: inserting the suspension means into the end-connector and placing the suspension means into the end-connector whereby the arrangement of the suspension means corresponds with the arrangement that is specified by the marking.

13. An end-connector, to fasten a flat-belt type suspension means of an elevator system, with a housing that includes two side walls and a first and a second wrapping element that each extend between the two side walls and can be wrapped in a specified arrangement by the flat-belt type suspension means so as to hold the suspension means fast in the end-connector by frictional engagement, comprising: on an outside of at least one of the two side walls facing away from the wrapping elements, a marking is provided that marks a specified arrangement of the suspension means, wherein the at least one side wall has a breakthrough through which the flat-belt type suspension means, preferably only in the specified arrangement, is visible, and wherein said breakthrough, through which the flat-belt type suspension means is visible, cuts said marking of the specified arrangement of the suspension means that is present on said outside of the at least one of the two side walls.

* * * * *